Nov. 3, 1959     O. N. GREEN     2,911,228
GOLF CART HAVING HINGED COMPARTMENTS FOR CLUBS
Filed May 28, 1954     2 Sheets-Sheet 1
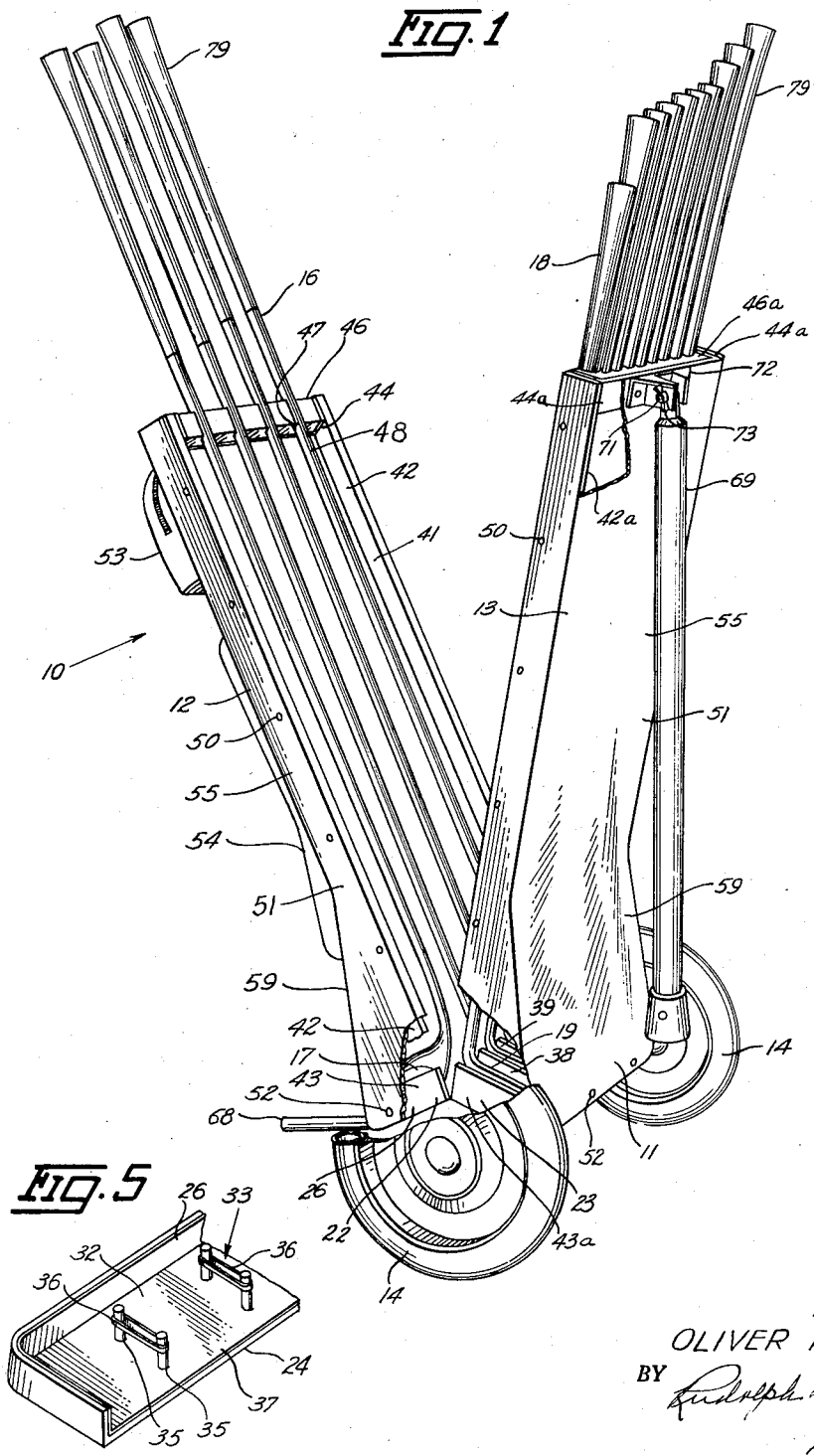
INVENTOR.
OLIVER N. GREEN
BY
ATTORNEY.

Nov. 3, 1959  O. N. GREEN  2,911,228
GOLF CART HAVING HINGED COMPARTMENTS FOR CLUBS
Filed May 28, 1954  2 Sheets-Sheet 2
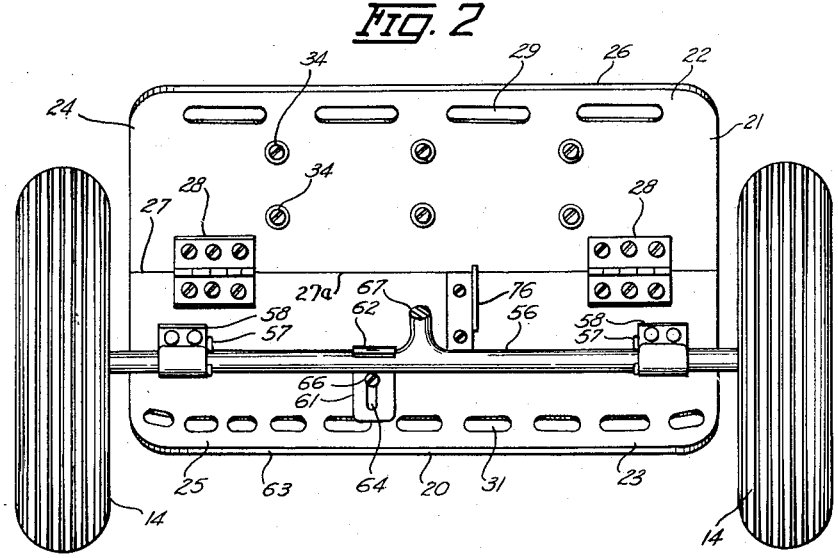
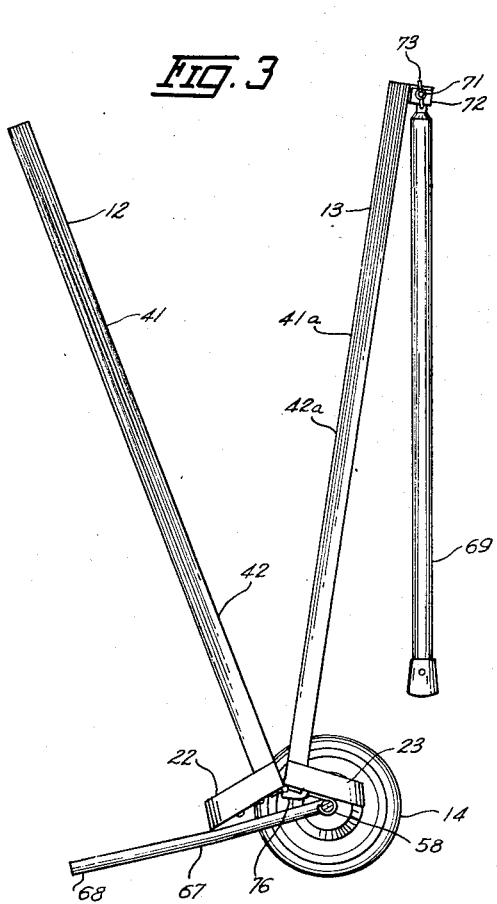
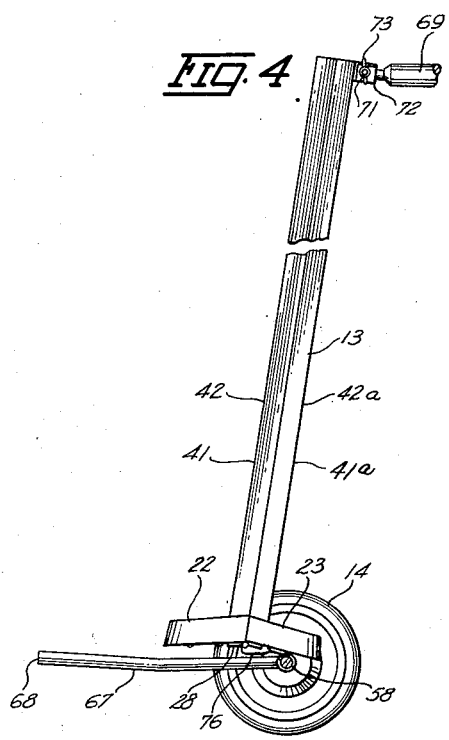
INVENTOR.
OLIVER N. GREEN
BY
ATTORNEY.

United States Patent Office 2,911,228
Patented Nov. 3, 1959

2,911,228

GOLF CART HAVING HINGED COMPARTMENTS FOR CLUBS

Oliver N. Green, Newton, Iowa

Application May 28, 1954, Serial No. 432,982

3 Claims. (Cl. 280—36)

This invention relates generally to golf cub carriers and more particularly to a combination golf bag and cart assembly.

An object of this invention is to provide an improved combination golf bag and cart.

A further object of this invention is to provide an improved golf bag or club carrier.

A further object of this invention is to provide a combination golf bag and cart assembly in which the golf clubs are arranged in a substantially upright relation with the head ends of the clubs positioned downwardly.

Another object of this invention is to provide a golf club carrier which includes a bag member having a pair of hinged sections movable against each other to a closed position, and away from each other to open the bag member for access to the clubs therein.

A further object of this invention is to provide a combination golf bag and cart having individual compartments for the club heads and individual holders for the club shafts to maintain the clubs out of contact with each other to prevent damage to the clubs.

Another object of this invention is to provide a combination golf cart and bag which is adapted to carry golf clubs in a position such that the hand grips for the clubs are readily accessible to thereby obviate the necessity for handling the club heads.

Still a further object of this invention is to provide a combination golf bag and cart assembly in which the heads of the golf clubs carried therein are positioned adjacent the axle for the cart wheels to thereby lower the center of gravity of the assembly to facilitate balance and handling thereof for both use and transport.

Yet another object of this invention is to provide a combination golf bag and cart assembly which is rugged in construction, economical to manufacture and which is readily manipulated to provide for the convenient transport of and ready accessibility to the golf clubs carried therein.

Further objects, features and advantages of this invention will become apparent from a consideration of the following description when taken in connection with the accompanying drawing in which:

Fig. 1 is a perspective view of the combination golf bag and cart assembly of this invention, with some parts broken away and other parts shown in section for the purpose of clarity;

Fig. 2 is an enlarged bottom plan view of the assembly shown in Fig. 1;

Fig. 3 is a side elevational view of the assembly shown in Fig. 1, with the covering for the golf club carrier removed for the purpose of clarity, and with the carrier shown in an opened self supported position for access to the clubs carried thereby;

Fig. 4 is a side elevational view, illustrated similarly to Fig. 3, and showing the golf club carrier in a closed transport position; and Fig. 5 is a fragmentary perspective detail view of the compartmented holder for wood clubs that forms part of the combination golf bag and cart assembly of this invention.

With reference to the drawing, the combination golf bag and cart assembly of this invention, indicated generally at 10, in Fig. 1 is illustrated as including an upright bag member 11 having a pair of relatively movable sections 12 and 13 carried on a pair of ground engaging wheels 14 arranged on transversely opposite sides of the bag 11. As shown in Fig. 1, wood clubs 16 are carried in the bag section 12 with the heads 17 of the clubs 16 down and adjacent the wheels 14. Likewise, iron clubs 18 are carried in the bag section 13 with the club heads 19 opposite the wood club heads 17 and adjacent the wheels 14.

The bag member 11 consists of a base 21 formed of a pair of hinged base sections 22 and 23 (Figs. 1 and 2) corresponding to the bag sections 12 and 13, respectively. Each of the base sections 22 and 23 has a substantially rectangular bottom wall 24 and 25, integrally formed with upright rim walls 26 and 20, respectively. Each rim wall 26 and 20 is extended about three sides of a corresponding bottom wall 24 and 25 such that the base sections 22 and 23 are open to each other at their hinged connection 28. As shown in Fig. 2, bottom walls 24 and 25 for the base sections 22 and 23 are formed with openings 29 and 31, respectively, to permit removal of dirt and the like which might be transferred into the base sections by the clubs 16 and 18.

The base section 22 is divided into four compartments 32 (Fig. 5) by means of three resilient partition or divider units 33 (only two of which are shown). Each divider unit 33 consists of a pair of upright cylindrical bars 35, corresponding substantially in height to the height of the rim wall 26, provided with threaded axial holes (not shown) in their lower ends for receiving screws 34 extended through the base section bottom wall 24. Flexible bands 36, of rubber, flexible plastic or the like, are extended about and between the pair of bars 35 for each divider unit 33. The flexible bands 36 thus preclude damage to the wood club heads 17 on contact of the heads 17 with the partitions 33. To further prevent any defacement to the club heads, a felt lining 37 is provided on the bottom wall 24 and rim wall 25 for the base section 22.

Since the iron clubs 18 are more durable and less easily damaged than the wood clubs 16, similar partition units are not required in the base section 23. The base section 23, is therefore, initially cast or otherwise formed with nine upright partitions 38 (Fig. 1) to provide ten compartments 39 for nine iron clubs and a putter. A suitable fabric lining, such as imitation leather or plastic, may be provided for the bottom and sides of each compartment 39.

The base section 22 has an upwardly extended support frame 41 (Figs. 1, 3 and 4), which includes a pair of upright frame members 42 secured at their lower ends to the base rim wall 26, adjacent the ends 43 of the rim wall 26 and at the inner side 27 of the base section. The frame members 42 are connected across their upper ends by a transverse brace member 44. Secured to the brace 44 of the frame 41 is a holding member 46 for the shafts of the clubs to be carried in the bag section 12. The member 46 is constructed of a resilient material, preferably India rubber, and has slots 47 cut in the front side thereof for frictionally receiving the club shafts therein. As shown in Fig. 1, four such slots 47 are formed in the member 46 for the bag section 12 for frictionally holding the shafts of four wood clubs 16.

The base section 23, similarly to the base section 22, has a support frame 41a, comprised of a pair of upright frame members 42a secured at their lower ends to the ends 43a of the rim wall 20 and at the inner side 27a of the base section 23. A brace member 44a, connected across the upper ends of the frame members 42a, carries a holder 46a. Similarly to the holder 46, for the bag section 12, the holder 46a is of a rubber composition and has slots (not shown) for frictionally receiving therein the shafts of the iron clubs 18.

A separate textile leather covering 51 (Fig. 1) is applied to each of the frames 41 and 41a. Each covering 51 is applied to its corresponding frame 41 and 41a by suitable fastening members 50 extended through the covering 51 and the upright frame members 42 and 42a. At their lower ends the coverings 51 are removably connected to the base sections 22 and 23 by any suitable means such as snap fasteners, indicated at 52. A small pocket 53 and a larger pocket 54 are provided on the bag section 12 for carrying extra golf balls and tees, and jackets, towels and the like, respectively.

It is seen, therefore, that each of the bag sections 12 and 13 is of an irregular shape, with each bag section having a narrow elongated upper portion 55 and a downwardly diverging lower section 59. By virtue of the hinged connection 28 of the base sections 22 and 23, their corresponding bag sections 12 and 13, respectively, are foldable against each other to enclose the clubs 16 and 18 carried thereby. Likewise, the bag sections 12 and 13 may be unfolded or swung apart from each other to effectively open the bag 11 to provide easy access to the clubs 16 and 18.

As best appears in Fig. 2, the cart wheels 14 are carried on an axle 56. In the assembly of the wheels 14 with the bag 11, the axle 56 is received in substantially U-shape brackets 58 carried on the underside and open to the inner side 27a of the base section 23. Thus, the axle 56 is readily received within the brackets 58 by merely moving the axle 56 through the open ends of the brackets 58. To maintain the axle 56 within the brackets 58, a clamp 61, having a hook or U-shape end portion 62 is adjustable transversely of the base 23.

The hook portion 62 is reversed relative to the U-brackets 58, so that on adjustable movement of the clamp 61 to position the axle within the hook portion 62, the axle is retained against transverse movement between the U-brackets 58 and the hook portion 62. Axial movement of the axle 56 is restrained by cotter keys 57, extended through the axle at positions to the inside of each bracket 58.

Adjustment of the clamp plate 62 is accomplished by the provision of a slot 64 therein for receiving a screw 66 carried in the base bottom wall 24, so that on tightening of the screw 66 the plate 61 is securely held in an adjusted position. To remove the axle 56 it is only necessary to loosen the screw 66, and move the clamp plate 61 so that the hook 62 thereon is in a clearance relation with the axle 56. The axle is then removable from the open ends of the U-brackets 58.

As shown in Fig. 2 the axle 56 is integrally formed intermediate its ends with a radially extended leg 67 which extends tranversely across the underside of the base section 22. When the carrier 10 is in a self supported upright position, such as when parked during the time the golfer is making a shot, the carrier 10 is tilted forwardly until the free end 68 of the leg 67 rests on the ground surface. Such manipulation of the carrier 10, gives the carrier a three point support, namely, the two wheels 14 and the leg 67, so that the carrier is firmly supported in a parked position.

In use, golf clubs are initially placed in the carrier 10 by opening the bag 11 to its position shown in Figs. 1 and 3. To so open the bag 11, it is only necessary to manually move the bag sections 12 and 13 away from each other until the base section 22 engages the leg 67. As best appears in Fig. 3, the relative hinged movement of the bag sections 12 and 13 is limited by the contact of an ear or stop 76 (Figs. 2 and 3) on the base section 23, with the bottom wall 24 of the base section 22. As best appears in Fig. 3 the stop 76 projects outwardly from the inner side 27a of the base section 23 to a position such that the bag sections 12 and 13, in their open position, form an included angle of about thirty degrees.

Wood clubs 16 are then positioned in the bag section 12 with the club heads 17 arranged in the compartments 32 formed in the base section 22, and with the club shafts 48 frictionally received within the notches 47 of the holder 46. Likewise, the irons 18 are arranged in the bag section 13, with the club heads 19 positioned in the compartments 39 in the base section 23, and with the club shafts frictionally received in the notches (not shown) of the holder 46a.

It is seen, therefore, that with the clubs 16 and 18 thus arranged in the bag 11, the handle grips 79 for the clubs project above the bag 11 so as to be readily accessible to the player. The club grips 79 are easily maintained in a clean condition, since there is no occasion for the player to handle the club heads, in contrast to bags now in common use in which the club shafts are carried in the bag so that the club heads project from the top of the bag.

For manually transporting the carrier 10, a handle 69 is provided on the bag section 13. The handle 69 is carried on a bolt 71 extended through a U-shaped bracket 72 carried on the transverse brace 44a. On manipulation of a wing nut 73, the handle 69 may be maintained in the substantial horizontal position shown in Fig. 4, to provide for manually transporting and steering the carrier 10, or the handle 69 may be folded against the bag section 13 for compact storage of the carrier 10.

In the transport of the carrier 10, the bag sections 12 and 13 are moved together as shown in Fig. 4, and the carrier 10 is swung rearwardly, by manipulation of the handle 69, about the wheels 14 to a position in which the leg 67 is in a clearance relation with the ground. The carrier 10 can then be either pushed or pulled as desired.

When the carrier 10, is in a transport position, as shown in Fig. 4, the weight of the bag section 12 maintains it against the bag section 13 and the clamped engagement of the brackets 58 and the hook portion 62 with the axle 56 prevents a free movement of the bag 11 about the axle 56. Thus the bag 11 is readily maintained in an upright position during transport and no latch, or like means, is required to connect the bag sections 12 and 13. Since the clubs 16 and 18 are heaviest at the their heads 17 and 19, respectively, when the carrier 10 is filled with clubs, the center of gravity of the club filled carrier is adjacent the axle 56, thereby facilitating transport of the carrier.

When the player wants to withdraw one of the clubs 16 and 18 from the bag 11 for the purpose of taking a shot, it is only necessary to swing the carrier 10 forwardly about the wheels 14 until the end 68 of the leg 67 contacts the ground, to give the carrier the above described three point support, and move the bag sections 12 and 13 apart to expose the clubs 16 and 18.

It may be readily appreciated, that due to the substantially upstanding nature of the sections 12 and 13, their hinged connections relative to each other and relative to the axle 56, which connections are parallel to the axle, and due to the lack of any connection at the upper ends of the sections 12 and 13, this forward swinging motion applied to the carrier 10 may well effect an automatic separation of the bag sections 12 and 13 from the position of Fig. 4 to that of Fig. 3, if such motion is sudden. Likewise, should a sudden rearward motion be applied to the handle 69, it may also be readily seen that the sections 12 and 13 may automatically be brought together from the position of Fig. 3 to that of Fig. 4.

From the above description it can be seen that this invention provides a combination golf bag and cart assembly 10 in which a pair of relatively movable bag sections 12 and 13 are readily manipulated to provide access to the golf clubs 16 and 18 and to enclose the clubs 16 and 18 during transport of the assembly 10. By virtue of the arrangement of the clubs 16 and 18 in the bag 11, such that their heads 17 and 19, respectively, are adjacent the axle 56, the center of gravity of the entire assembly is adjacent the axle, thereby facilitating the balance of the assembly 10 in transport. Further, by virtue of this arrangement of the clubs 16 and 18, the club grips 79 are readily accessible to the player, are kept clean and out of contact with each other and are thus maintained in good condition over a long service life. The provision of separate compartments 32 for the heads 17 of the wood clubs 16, and similar compartments 39 for the heads 19 of the iron clubs 18, maintains the club heads out of contact with each other and consequently prevents nicking and marring of the club heads.

It is to be understood that the bag 11 is useable without the wheels 14, axle 56, brace 67, and handle 69, if a player desires to carry the bag 11. In such use, the bag 11 is supported in an upright position directly on the base sections 22 and 23 when the player is making a shot, and is useable in the same manner as above described.

Although the invention has been described with respect to a preferred embodiment thereof, it is to be understood that it is not to be so limited, since changes can be made therein which are within the full intended scope of this invention as defined by the appended claims.

I claim:

1. In a cart for carrying golf clubs including an axle and wheel assembly, a bag member comprising a pair of complementary bag sections each of which includes a base section and an upright frame section, means for hingedly connecting contiguous side portions of said base sections together for movement of said bag sections toward and away from each other to open and close said bag member, with an upright frame section being extended upwardly from a corresponding base section at the hinged side portion thereof, said base sections being of a width to receive the heads of golf clubs having the shafts thereof extended longitudinally of and supported on said upright frame sections so that the club shafts in said bag sections are in a back to back relation when said bag member is closed, means for mounting one of said bag sections on said axle, and means on said bag member for limiting the movement of said bag sections away from each other.

2. In a cart for carrying golf clubs including a wheel and axle assembly, a bag member comprising a pair of complementary bag sections for receiving golf clubs each of which includes a base section for supporting the golf club heads and an upright frame section for supporting the golf club shafts, means pivotally connecting said base sections together to provide for a pivotal movement of said bag sections toward and away from each other to define open and closed positions of said bag member, with the club shafts in said bag sections being in a back to back relation when said bag member is in a closed position therefor, means for mounting one of said base sections on said axle, means on said bag sections for limiting their movement away from each other, a handle member on said one bag section, and ground engaging means extended radially from said axle toward said other bag section to hold said bag member against tipping movement in one direction.

3. In a cart for carrying golf clubs including an axle and wheel assembly, a pair of golf club carrying sections, each of which includes a base section and an upright frame section extended upwardly from one side of a base section, means pivotally connecting said base sections together at said one side thereof to provide for a relative movement of said club carrying sections against and away from each other, with a base section being of a size to receive the heads of golf clubs thereon when the club shafts are supported on a corresponding upright frame section so that when said bag sections are against each other the club shafts in one bag section are in a back to back relation with the club shafts in the other bag section, means for mounting the base section of said one bag section on said axle, and coacting means on said base sections for limiting the movement of said bag sections away from each other.

References Cited in the file of this patent

UNITED STATES PATENTS

| | | |
|---|---|---|
| 1,189,879 | Shamberg | July 4, 1916 |
| 2,428,853 | Procter | Oct. 14, 1947 |
| 2,435,893 | Mall | Feb. 10, 1948 |
| 2,551,009 | Kaltenbach | May 1, 1951 |
| 2,551,780 | Wood | May 18, 1951 |
| 2,726,874 | Sullivan | Dec. 13, 1955 |